United States Patent [19]

Peruffo et al.

[11] 4,125,067

[45] Nov. 14, 1978

[54] MACHINE FOR WASHING, SELECTING, CLEANING AND SLICING THE STEMS OF MUSHROOMS

[75] Inventors: Alessandro Peruffo; Renzo De Barba, both of Vicenza, Italy

[73] Assignee: TEIMEX A.G. IMP-EXP Teilmetallbau, Liechtenstein

[21] Appl. No.: 749,628

[22] Filed: Dec. 13, 1976

[30] Foreign Application Priority Data

Dec. 24, 1975 [IT] Italy .................................. 85643/75

[51] Int. Cl.² ...................... A23N 15/02; A47J 21/00
[52] U.S. Cl. ..................................... 99/639; 209/247; 99/536; 99/643
[58] Field of Search ................ 99/484, 516, 536, 546, 99/635, 637, 639, 643; 209/247, 10, 307–308; 15/3.11; 83/22; 134/63, 68, 133–134

[56] References Cited

U.S. PATENT DOCUMENTS

| 1,333,858 | 3/1920 | Low | 99/643 |
|---|---|---|---|
| 2,316,159 | 4/1943 | Evett | 99/516 |
| 2,595,312 | 5/1952 | Talboys | 209/247 |
| 2,978,003 | 4/1961 | Benekam | 99/643 |
| 3,080,904 | 3/1963 | Carmichael | 99/643 |
| 3,164,182 | 1/1965 | Hughes | 99/643 |
| 3,179,138 | 4/1965 | Norris | 99/643 |
| 3,304,973 | 2/1967 | Norris | 99/643 |
| 3,447,544 | 6/1969 | Vergara | 99/536 |
| 3,545,512 | 12/1970 | Baker | 99/639 |

*Primary Examiner*—Robert W. Jenkins
*Assistant Examiner*—Timothy F. Simone
*Attorney, Agent, or Firm*—Bucknam and Archer

[57] ABSTRACT

A machine for washing, sizing and cutting the stems of mushrooms, comprises a tub full of water into which the fresh mushrooms to be treated are poured in bulk and conveyed in water into a second tub from which they are raised by suitable means to be carried on a selector device from which they fall in different positions according to their dimensions. Then they are conveyed on guides where they are arranged with their stems downwards and subsequently they are carried to the cutting device constituted by endless rotating toothed belts which provide for cutting. The first dirty end of the stem is thrown away and then a section of stem intended to be used as food is cut off so as to reduce the length of the stem to predetermined sizes. In this manner, the washed mushrooms are classified on the basis of their size and with the stem reduced to predetermined dimensions.

12 Claims, 5 Drawing Figures

MACHINE FOR WASHING, SELECTING, CLEANING AND SLICING THE STEMS OF MUSHROOMS

The present invention relates to a machine by means of which mushrooms are washed, sized, stripped of the dirty stalks and then eventually a part of the stem is cut to bring it to the prescribed length.

It is known that edible fungi in particular cultivated fungi should be preferably washed and then the end of the stalk which has the mould nearly always present on it should be removed before placing the mushrooms in the appropriate containers in which they are sold.

Very often in particular according to the regulations of some countries the stem must be brought to predetermined dimensions, a step which is carried out by cutting off a part of the mushroom with the consequent production of an edible segment.

All these operations require a large amount of labor, a fact which increases substantially the cost of production with results which are not always very satisfactory.

With the adoption of the machine of the present invention on the contrary all these operations are effected automatically and further the machine of this invention permits to size the mushrooms on the basis of the dimensions of their caps so as to be able to gather them in groups classified by uniform dimensions as generally required in the market.

The machine of this invention is characterized in that it comprises a tub full of water into which the fresh mushrooms to be treated are poured in bulk and conveyed in water into a second tub from which they are taken by suitable means to be carried to a selector device from which they fall in positions on inclined planes, the positions being more advanced the larger their dimensions and successively on guides where they are arranged with their stems downwards, to be carried then to the cutting devices constituted by endless toothed belts which provide for the cutting. The dirty end of the stem to be thrown away is cut first and then a section of stem intended to be used as food is cut so as to reduce the length of the stem to predetermined sizes thus obtaining washed mushrooms classified on the basis of their size and with the stem reduced to predetermined dimensions.

According to a preferred embodiment the machine comprises a collecting tub full of water into which the mushrooms are collected and poured in bulk, a second tub in which is disposed at least one jet of water which causes a surface current so as to cause the mushrooms to advance and to carry them onto an endless rotating belt conveyor. The conveyor is provided with projecting vanes which lift the mushrooms and cause them to fall onto a selector device when they classified on the basis of the dimensions of the mushrooms. The selector device for example may be constituted by a series of rotating belts slightly diverging from one another. The smallest mushrooms fall quite quickly from these belts onto the first series of inclined channels disposed under the said belts whilst the mushrooms of larger dimensions proceed further and fall into a second series of channels disposed after the first series and all mushrooms of excessive dimensions fall at the end of the belts into a collecting basket underneath. Similarly corresponding to the very first part of the belts there is disposed a discharge hopper for the mushrooms which are too small.

In the highest part of the inclined channels are provided jets of water which push the mushrooms downwards directing them along suitable paths each constituted by two sections suitably shaped with free spaces between them.

On every path at the base of the section are disposed two rotating bearing cables.

The paths converge up to the narrowest point corresponding to the first cutting belt and then diverge out to be returned to the initial width at the discharge point of the mushrooms.

Immediately after the inclined plane above the narrow openings are disposed rotating brushes mounted on a shaft with two brushes per each narrow opening which have the object of straightening the mushrooms placing them with the stem downwards between the empty spaces existing between one section and the other and with the cap supported on the base of the section. On the sections are applied water jets two and more per each narrow opening which serve the purpose of straightening any mushroom which has not been straightened by the brushes.

The mushrooms are carried by bearing cables against two following band saws; the first of which cuts from the stem of the mushroom the dirty end of the mould whilst the second saw cuts if desired a section of stem constituting the slice. Obviously when the stem is already short in itself this second cutting does not take place.

Under the first band saw is disposed a lifting device, for example, a rotating roller, covered outside with a soft material, for example, raw rubber, which lifts the mushrooms so as to permit the cutting of the dirty ends of same. Of course such a device may also assume other forms. Above the grooves corresponding to the first saw band is disposed a cylinder of soft material (rubber) which pushes the mushrooms towards the lower roller disposed under the saw and prevents them from turning upside down at the moment they are raised. Subsequently the mushroom falls down again with its cap between the diverging bearing wires passing in correspondence with the continuous butting band saw at a predetermined distance between the cap and the cutting plane.

Under this part of the machine are disposed some special tubs the first of which collects the mushrooms and the parts of the mushrooms which fall from the transporting wires before the first cutting saw. The mushrooms are then carried to the collecting tub by means of a suitable conveying channel with base moistened by running water.

A second hopper is disposed under the first cutting band saw to collect the dirty ends of the stem which by means of a suitable tubular conduit are discharged into a lateral collecting tank.

A third tub of smaller dimensions is disposed under the second cutting blade for the purpose of collecting the slices or the parts of the stems of the mushrooms cut by the second saw and these parts through a suitable conduit are caused to fall into a collecting container.

The cut mushrooms then fall at the end of the conveying wires onto an inclined plane under which are disposed the collecting boxes in number corresponding to the desired groups of dimensions.

The machine will now be seen here described in more detail by reference to the drawings of which:

FIG. 1' shows an enlarged detail of the guide wires of the machine;

FIG. 4' shows an enlarged detail of FIG. 4;

Figure 2:
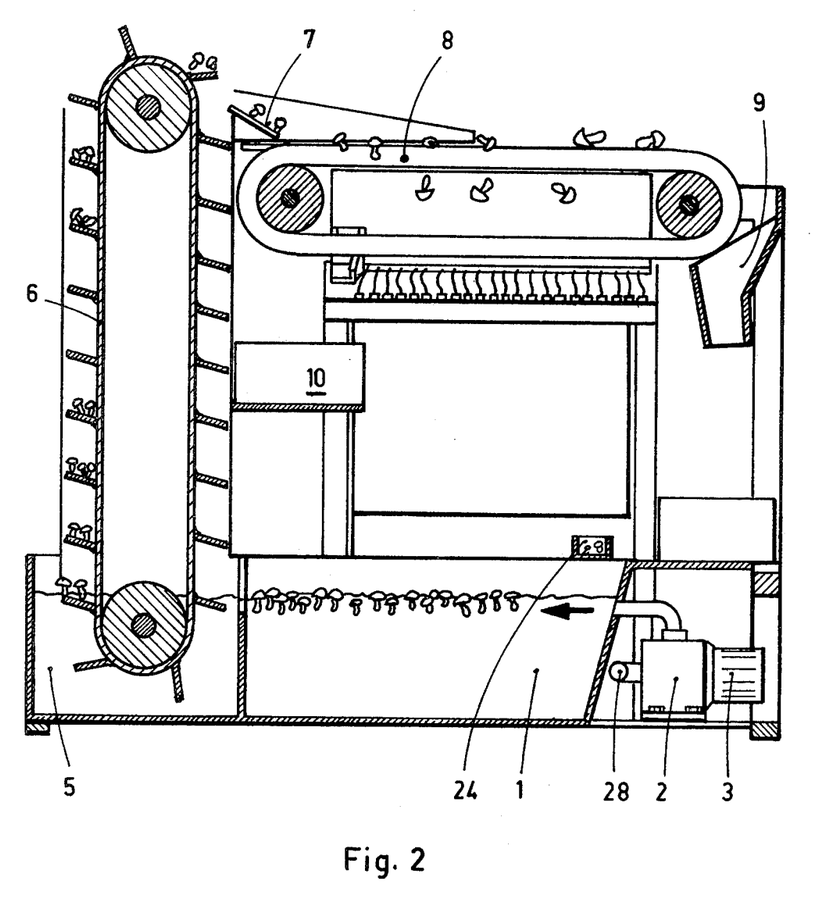
FIG. 2 shows a vertical section along the line II—II of FIG. 1 of same.
Figure 3:
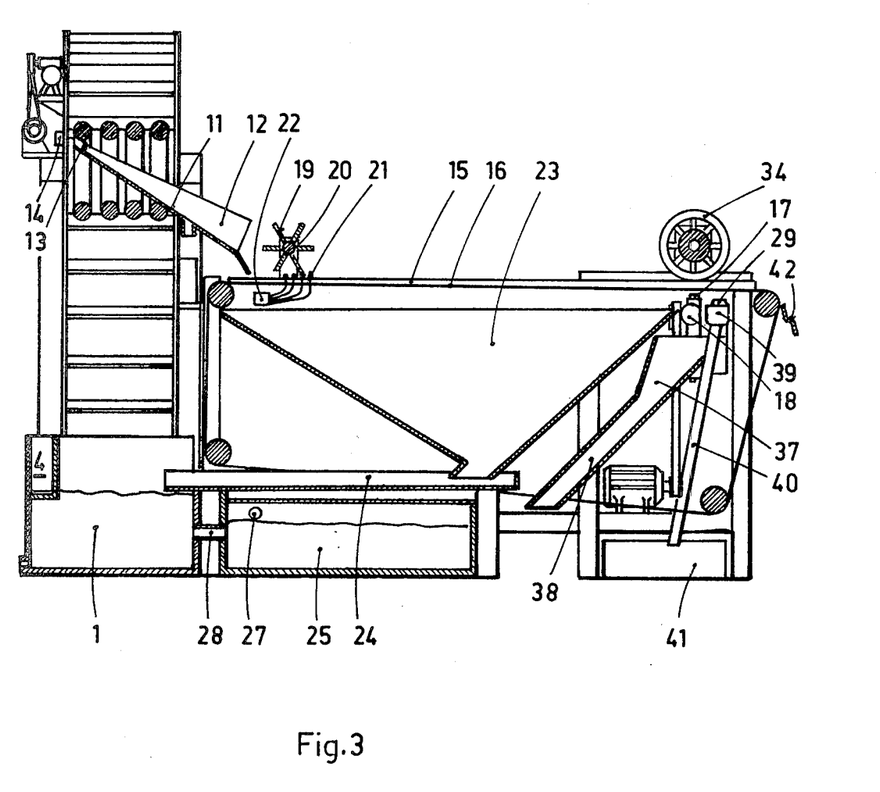
FIG. 3 shows a vertical section along the line III—III of FIG. 1 of same.
Figure 4:
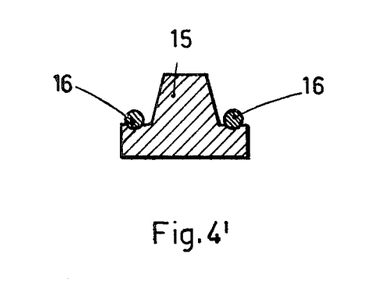
FIG. 4 shows a vertical section along the line IV—IV of FIG. 1 of same.

The machine of the invention comprises a tub 1 (FIGS. 1 and 2) into which the fresh mushrooms are introduced in bulk. The tub is full of water and the mushrooms which as is known float are pushed by a current caused by the pump 2 controlled by the electric motor 3, through the passage of reduced height 4 (FIG. 3) in the tub 5. They are then taken by means of the elevator 6 constituted by an endless rotating belt provided with inclined blades on which the mushrooms are placed in variable number. They are caused to fall by means of inclined plane 7 on a series of resilient belts with variable divergence 8. Belts 8 rotate and by means of guide pulleys cause the mushrooms to fall in sequence according to the dimensions of the caps, initially the mushrooms with smaller caps and then according to their dimensions progressively whilst the mushrooms of exceptional dimensions are kept separate. Also the mushrooms which do not fall on the straight section of the belt 8 are discharged through the hoppers 9 outside the machine.

Similarly the smallest mushrooms fall at the beginning of the belts 8 into a basket 10 and are used for various purposes.

Figure 1:
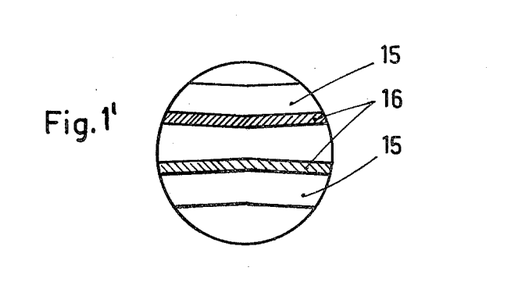
FIG. 1 shows the complete top view of the machine.

Due to the diverging disposition of the belts 8 as seen in FIG. 1 a selection is thus effected on the basis of the dimensions of the mushrooms. Mushrooms which fall on the inclined plane 11 which is subdivided into parallel channels 12 are classified according to size so that the smallest mushrooms descend into the first channels and the larger mushrooms into the last channels.

The descent of the mushrooms along the inclined plane is facilitated by the jets of water issuing from the nozzles 13 (FIG. 3) fed by the conduit 14 with water coming directly from the pump 2. The mushroom then descends onto a series of parallel guides 15 of suitable shape and separated by variable interstices so as to allow the stems of the mushrooms to pass while the caps do not go through.

On the lower part of the guide 15 are disposed on suitable grooves two bearing cables 16 (FIGS. 1, 3, 4, 5) which support the mushrooms from under the caps and allow the stems to pass underneath.

The wires 16 (FIG. 4') supported by the guides and directed by them are arranged convergently, that is more closely towards the cutting point in the location of the blade 17 thus resulting in a satisfactory gripping of the mushrooms at the moment of cutting. The guides 16 in the rectilinear part may be advantageously interrupted to allow the mushrooms to fall into the tub 23 located underneath. Immediately behind the cutting point, the wires 16 diverge to allow the mushrooms to be eventually raised by the device 13 to rest again with caps on the wires 16 (see FIG. 1').

Immediately behind the inclined plane 11 above the guides 15 are placed strengthening devices for the mushrooms. The first is constituted by a series of rotating brushes 19, the guides being mounted on a transverse shaft which guides strike with their bristles the mushrooms not yet correctly positioned.

A second device is constituted by a series of nozzles 21 with special jets of water from the conduit 22. The jets with different working pressures strike any stems which have not yet fallen between two grooves downwards. These jets of water besides straightening the mushrooms serve also as a further washing of the said mushrooms.

The water which drops from the plane 11 passes through the section 15 and falls into the collecting tub 23 arranged underneath and is then discharged into an inclined channel 24 in the opposite direction 18 which conveys it into the tub 1. The tub 23 covered with a close mesh net is in communication with the tub 5 by means of the channel 26 (FIG. 4) and is provided with a full discharge 27 (FIG. 3) which keeps the level of the water in this and in the tubs 1 and 5. The water is removed from the tub 25 by means of the pump 2 through the tube 28 to be returned to the tub 1 forming the surface current as first described.

In any case the attendant for the supervision of the machine will be able to intervene easily when some mushrooms behind the straightening devices are not well directed with the stems downwards.

Detached parts of the mushrooms, dirt and foreign bodies will fall through the guides in the tubs 23 and then in the channel 24 and then into the tub 1.

Figure 5:
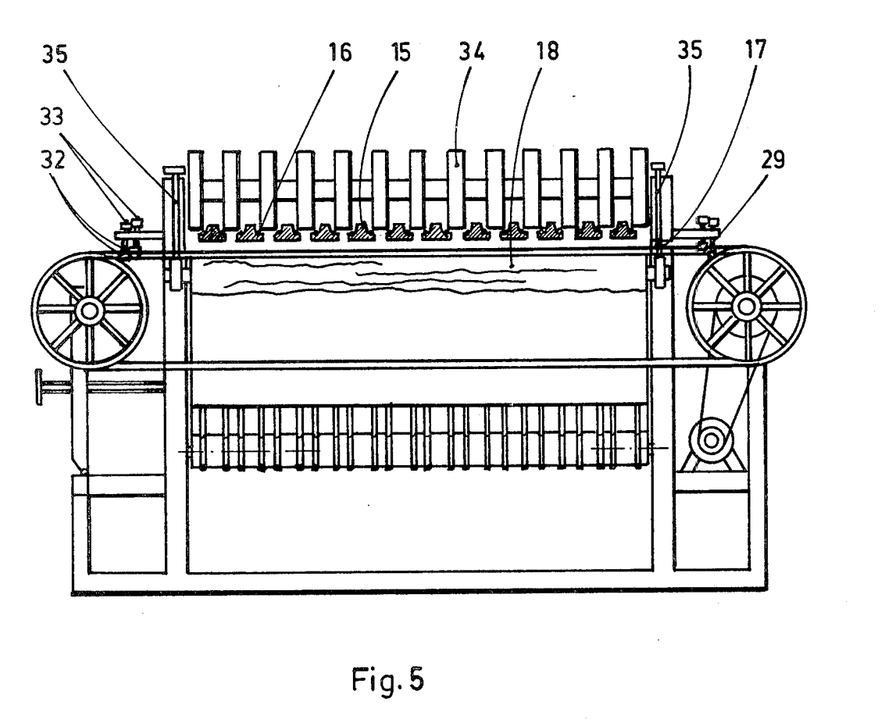
FIG. 5 shows a vertical section along the line V—V of FIG. 1 of same.

A rotating roller 18 the surface of which is advantageously covered with soft material, for example, raw rubber, is disposed under the first cutting plate 17 which similarly to the second cutting blade 29 comprises a continuous belt rotating on drums 30 and 30', 31 and 31' (FIG. 5). The blades provide for cutting the last part of the stem with the relative dirt, mould or other material attached to this part and then for cutting the next part of the stem and reducing at the same time the length of the stem of the mushroom with predetermined dimensions.

The blades 17, 29 pass in the blade guides 32 (FIGS. 3 and 5), the height of which may be varied by means of the screws 33' which permits regulation with accuracy of the level of the cut.

The cut is effected by the first blade 17 whilst the mushroom is raised by the rotating roller 18 at the moment when the wires 16 deviate one from the other thus ending the grip on the said stem.

Above the first blade 17 there is disposed a roller 34 with cylindrical sectors of soft and elastic material which has the object of holding in vertical position the mushrooms pressing them towards the roller 18 at the moment of the first cut.

The roller 34 is regulated in height according to the dimensions of the mushrooms by means of suitable guides 35 controlled by knobs.

The height of the rollers 18 may be regulated by means of screws controlled by the knobs 36.

A minimum length of the stem is therefore cut sufficient to eliminate the dirt, mould etc. attached to it which falls in the hopper 37 from which through a tube 38 it is carried outside of the machine onto a small collecting tank.

The following cut by means of the blade 29 is effected when the mushroom falls with its cap onto the wires so that it allows cutting a second part of the stem which is collected in the tub 39 from which trough through tube 40 it falls into the collecting box 41.

This second cut of course is not effected when the stem is already in itself of reduced length. In any case the second cut which takes place on a plane perfectly perpendicular to the axis of the stem regularizes the end of the stem better when the first cut is effected in an inclined position.

Advantageously by means of the guide blades 32 the cutting band 29 will be disposed so as to determine the length of the stem as provided by some regulations in proportion to the diameters of the cap of the mushrooms.

This part of the stem generally called "slices" is used for eating purposes in particular in pizzerie.

The mushrooms with the stem cut to a pre-established length fall by means of the inclined plane 42 into collecting boxes underneath, not shown, disposed in number equal to the kinds of product desired distinguished on the basis of the desired dimensional limits.

It is obvious that the particular constructional details of the machine have been described and illustrated in the sheets of drawings attached in one of these particular constructional embodiments indicated simply by way of a non-limiting example, these being able to assume different forms and requirements, the essential features of the invention remaining without thereby departing from the scope of the invention.

We claim:

1. A machine for washing, sizing and cutting the stems of mushrooms which comprises a tub full of water into which the fresh mushrooms to be treated are poured in bulk, a second tub, means for conveying the mushrooms from the first tub into the second tub, a selector device for sizing the mushrooms, means for lifting the mushrooms onto said selector device and a plurality of inclined channels located under said selector device, means for carrying the mushrooms onto said inclined channels, said selector device consisting of a plurality of rotating belts divergently arranged whereby spaces of progressively increasing width are formed between the belts and the mushrooms fall the more advanced the bigger the size into positions on said inclined channels, a cutting device, guides for transporting the mushrooms towards the cutting device with their stems downwards said cutting device being constituted by first endless toothed belt which provides for cutting the dirty end of the stem to be thrown away.

2. The machine according to claim 1 wherein the cutting device additionally comprises second cutting means for cutting an edible section of the stem and reducing the length of the stem to a predetermined value.

3. A machine according to claim 1 which comprises means for forming water currents in the second tub which carry mushrooms into the proximity of the means for lifting the mushroom through a passage of reduced section to hold back the dirt and foreign bodies.

4. A machine according to claim 1 wherein the means for lifting the mushrooms from the second tub to the selector device consists of an endless rotating band with radial vanes by which the mushrooms are raised in groups to be discharged by means of an inclined plane onto the selector device.

5. A machine according to claim 1 wherein said guides are provided at the bottom thereof with wires convergently arranged and the mushrooms are forced by said guides and wires to place themselves with their stems downwards and their caps supported on said wires, said guides being convergent in the path up to the cutting device and being divergent after the cutting device at the discharge point of the mushrooms.

6. A machine according to claim 1 which comprises a series of jets of water arranged on said inclined channels causing a final washing of the mushrooms and causing the mushrooms to fall downwardly and a tub is disposed under said guides to return the water to the first tub.

7. A machine according to claim 1 which comprises at least one rotating brush downstream of said inclined channel to straighten the mushrooms with stem downwards.

8. The machine according to claim 1 wherein the cutting device comprises means for adjusting the height of said endless toothed belt and the machine comprises means for lifting the mushrooms to bring them in contact with said belt.

9. A machine according to claim 8 wherein the cutting device additionally comprises a rotating toothed blade arranged downstream of said toothed belt.

10. A machine according to claim 8 wherein said means for lifting the mushrooms is a first roller and a second roller is provided to press the mushrooms against said endless first toothed belt.

11. The machine according to claim 1 which comprises means for forming water jets acting on the mushrooms in said guides to cause them to converge towards said cutting device with the stems downwardly.

12. The machine according to claim 5 wherein said wires which diverge after contact with said cutting device transport the mushrooms to collection means.

* * * * *

UNITED STATES PATENT OFFICE
CERTIFICATE OF CORRECTION

Patent No. 4,125,067          Dated November 14, 1978

Inventor(s) Alessandro Peruffo and Renzo de Barba

Figure 6:
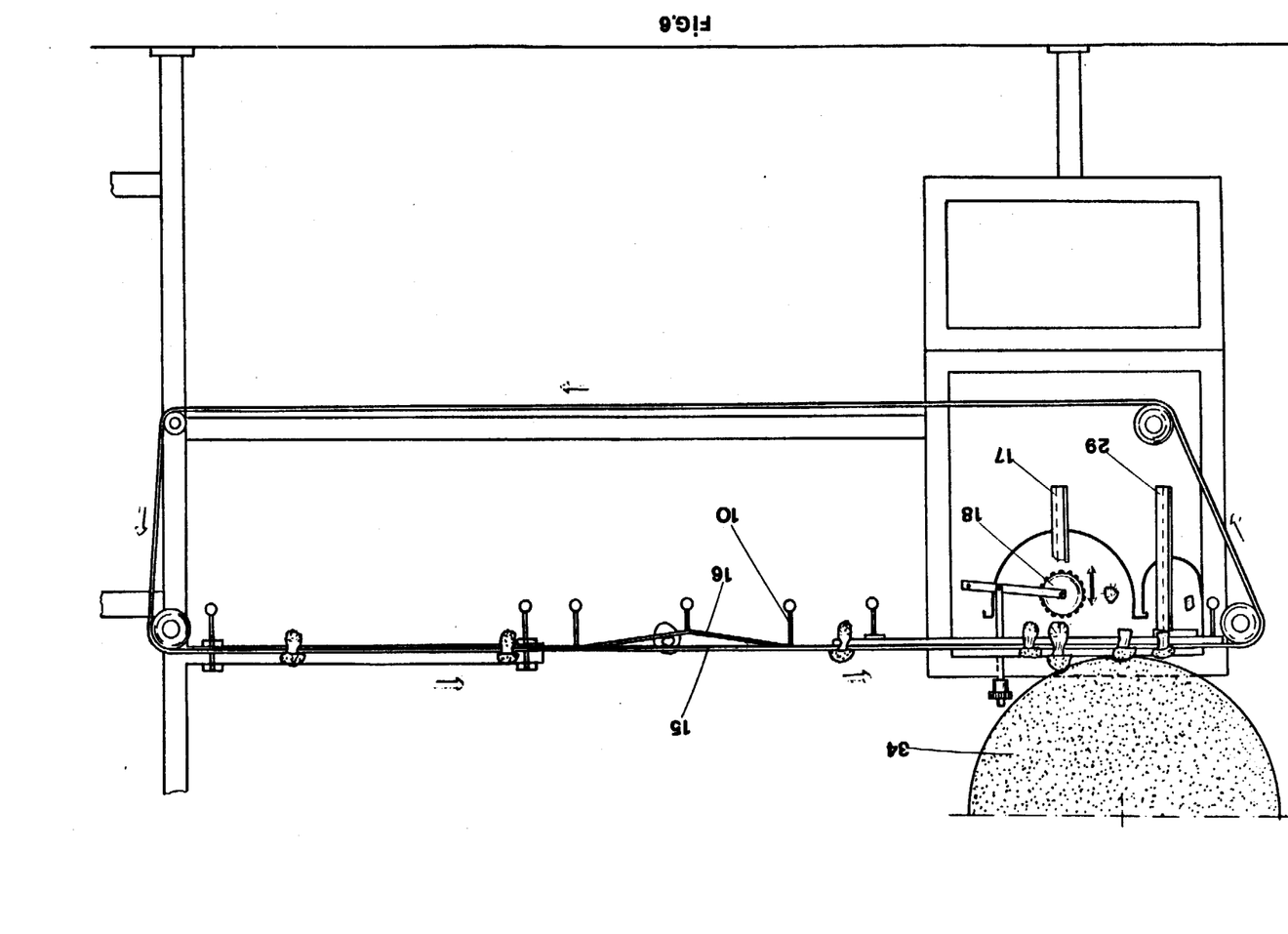

It is certified that error appears in the above-identified patent and that said Letters Patent are hereby corrected as shown below:

Column 3, line 12, before "The machine" insert:--Fig. 6 illustrates the cutting assembly with the mushrooms being carried to the selector device and then being carried on guides 16 with the stems downwards;--

Figure 7:
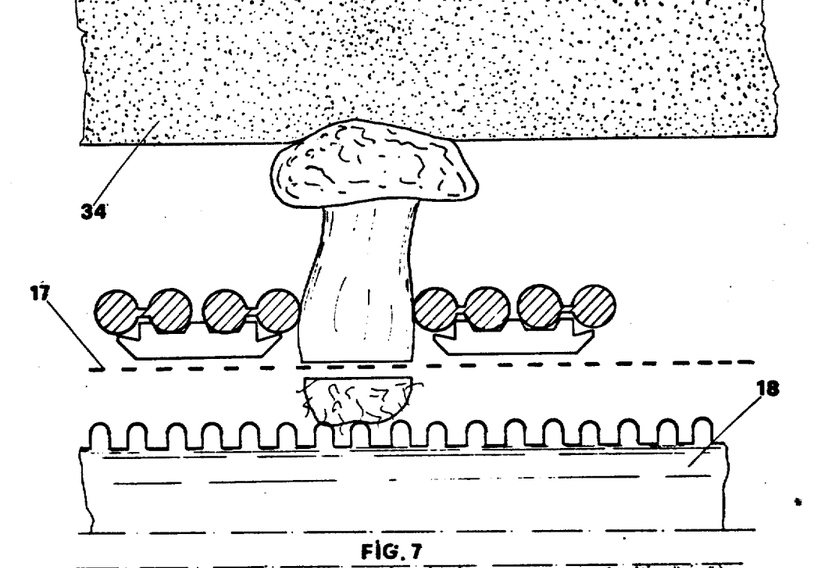

Fig. 7 illustrates the first cutting step with the mushrooms being lifted by roller 18.

Figure 8:
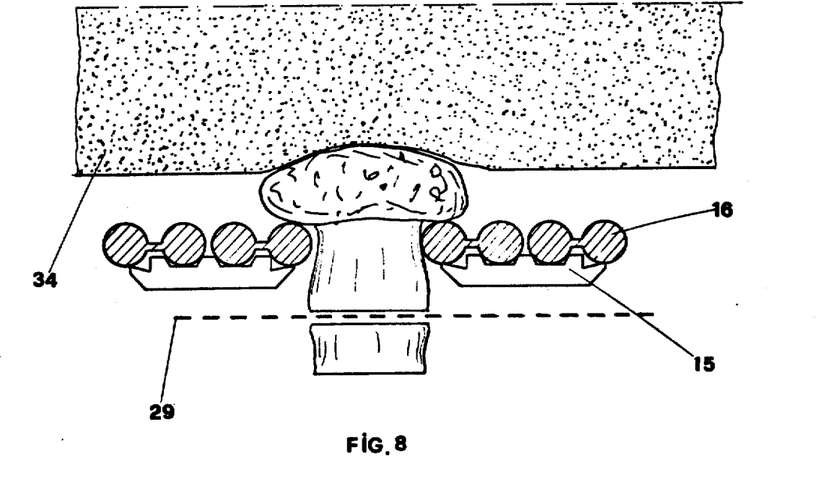

Fig. 8 illustrates the second cutting step by means of blade 29.

Signed and Sealed this

Twenty-fourth Day of July 1979

[SEAL]

Attest:

Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,125,067
DATED : November 14, 1978
INVENTOR(S) : Alessandro Peruffo and Renzo de Barba It is certified that error appears in the above—identified patent and that said Letters Patent is hereby corrected as shown below:

Insert FIGS. 6, 7 and 8, as per attachments.

Column 3, line 12, before "The machine" insert

--    Fig. 6 illustrates the cutting assembly with the mushrooms being carried to the selector device and then being carried on guides 16 with the stems downwards;

Fig. 7 illustrates the first cutting step with the mushrooms being lifted by roller 18.

Fig. 8 illustrates the second cutting step by means of blade 29. --.

This certificate supersedes Certificate of Correction issued July 24, 1979.

Signed and Sealed this

Eighth Day of January 1980

[SEAL]

Attest:

SIDNEY A. DIAMOND

Attesting Officer     Commissioner of Patents and Trademarks

FIG.6

Patent No. 4,125,067 November 14, 1978

Alessandro Peruffo and Renzo de Barba

FIG. 7

FIG. 8